H. & A. DUFAUX.
BRAKE FOR MOTOR DRIVEN CYCLES AND OTHER VEHICLES.
APPLICATION FILED SEPT. 25, 1908.
953,126.
Patented Mar. 29, 1910.
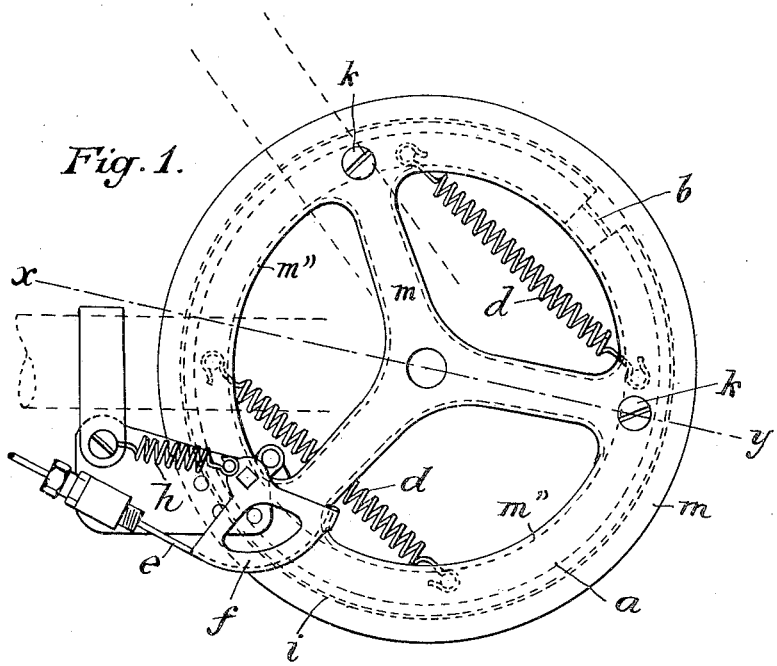
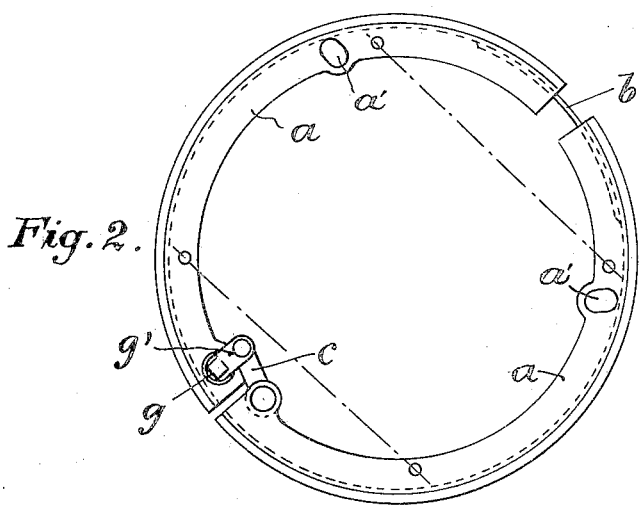
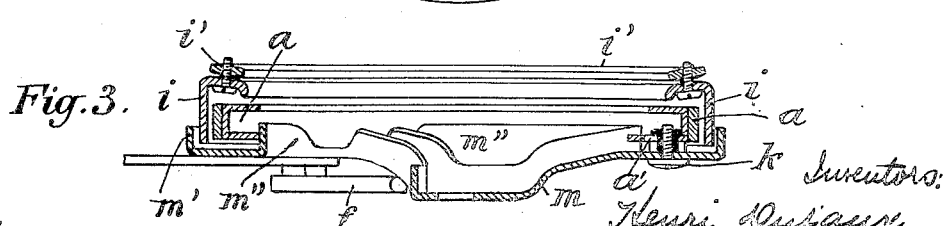

UNITED STATES PATENT OFFICE.

HENRI DUFAUX AND ARMAND DUFAUX, OF GENEVA, SWITZERLAND.

BRAKE FOR MOTOR-DRIVEN CYCLES AND OTHER VEHICLES.

953,126.  Specification of Letters Patent. Patented Mar. 29, 1910.

Application filed September 25, 1908. Serial No. 454,734.

*To all whom it may concern:*

Be it known that we, HENRI DUFAUX and ARMAND DUFAUX, citizens of Switzerland, residing at Geneva, Switzerland, have invented certain new and useful Improvements in Brakes for Motor-Driven Cycles and other Vehicles; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of the invention are to construct a brake for motor driven vehicles that comprises a brake band mounted on the axle or wheel of a vehicle, and a support mounted on the frame, combined with brake shoes that are adapted to be forced apart to engage the brake band to cause a braking action. The brake shoes are mounted to rest on the support and to be concentrically supported thereon and held snugly thereto, and when in this normal position being but a slight distance from the brake band so that when the operating mechanism is actuated, the brake shoes have a very slight distance to move before they engage the brake band.

The invention is illustrated in the accompanying drawing, in which—

Figure 1 is a front view of the device, and Fig. 2 is a front view of the brake shoes. Fig. 3 is a section through $v-y$ in Fig. 1.

The brake shoes $a$ are formed in the shape of segments and are normally slightly separated, being pivoted at one end by a flat spring $b$, one of the segments having, from its end opposite the spring $b$, a link $c$, which link is operated to force the shoes apart by an arm $g'$ which is mounted on the stud $g$. The inward movement of the brake shoes $a$, toward each other, is caused by the springs $d$ which are shown in Fig. 1, and this movement, inward, is limited by the flange $m''$ of the support $m$, which support is formed preferably in the shape of a spider and has the peripheral flange $m'$. This support $m$ is secured to the frame in any suitable way, the brake shoes being held in sliding engagement with the support by the screws $k$ which work in the slots $a'$ in the brake shoes, as shown in Fig. 1.

The brake band $i$ is preferably made with an inwardly turned flange portion which is fastened by screws or other means to a ring $i'$, this ring in the brake band being adapted to clamp the spokes of the motor-cycle wheel, or similar vehicle wheel, in the usual manner. The circumference of the brake band is such that when the brake shoes are drawn in to the support, there is very little space between the brake shoes and the brake band so that but a slight motion of the brake shoes is necessary to cause them to engage the brake band. The separation or forcing apart of the brake shoes $a$, by the rocking action of the link $c$ and the arm $g$, is caused by a segment-shaped piece or lever $f$ which in turn is actuated by a suitable connection $e$, preferably flexible, the lever $f$ being normally returned to its position when the operating means $e$ is actuated by reason of the spring $h$.

It will be understood that other kinds of springs, except the helical springs $d$ shown in the drawing, can be used.

Having thus described our invention, what we claim is:—

1. A brake comprising a support having a circular flange, a pair of segment-shaped brake shoes, springs to force the brake shoes in engagement with the flange, a link on one end of one of the brake shoes, a stud passing through the other abutting end of the adjacent brake shoe, an arm on the stud, manually operated means for turning the stud to force the brake shoes from the flange of the support, and a brake band surrounding the brake shoes and adapted to be engaged by them when they leave the support.

2. In a brake, a support having a circular flange, segment-shaped brake shoes, springs connecting the segments to force them toward each other in engagement with the flange, a brake band surrounding the shoes, a link on the end of one segment, a stud passing through the abutting end of the other segment, the link and the arm being pivotally connected, the stud passing through the support, a lever on the support, and manually operated means for actuating the lever.

In testimony, that we claim the foregoing, we have hereunto set our hands this twelfth day of September 1908.

HENRI DUFAUX.
ARMAND DUFAUX.

Witnesses:
R. SOLLBERGER,
L. H. MUNIER.